(12) United States Patent
Schepp et al.

(10) Patent No.: US 7,004,733 B2
(45) Date of Patent: Feb. 28, 2006

(54) PISTON PUMP

(75) Inventors: Rene Schepp, Waiblingen (DE);
Werner-Karl Marquardt,
Markgroeningen (DE); Wolfgang
Schuller, Cleebronn (DE); Jochen
Feinauer, Neuenstein (DE); Dirk
Foerch, Neuenstadt/Stein (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/482,024

(22) PCT Filed: Feb. 15, 2002

(86) PCT No.: PCT/DE02/00530

§ 371 (c)(1),
(2), (4) Date: Jul. 7, 2004

(87) PCT Pub. No.: WO03/004872

PCT Pub. Date: Jan. 16, 2003

(65) Prior Publication Data
US 2004/0234400 A1   Nov. 25, 2004

(30) Foreign Application Priority Data
Jun. 30, 2001   (DE) ................................ 101 31 763

(51) Int. Cl.
F04B 11/00   (2006.01)

(52) U.S. Cl. ..................................... 417/470; 417/540
(58) Field of Classification Search ................ 417/470, 417/540, 569, 570; 137/207; 138/30
See application file for complete search history.

(56) References Cited

U.S. PATENT DOCUMENTS

| 2,371,632 A | * | 3/1945 | Lippincott .................... 138/30 |
| 4,729,360 A | | 3/1988 | Fehrenbach et al. |
| 6,062,830 A | | 5/2000 | Kikuchi et al. |
| 6,520,756 B1 | | 2/2003 | Alaze |
| 2004/0166004 A1 | * | 8/2004 | Schmitt et al. ............. 417/470 |

FOREIGN PATENT DOCUMENTS

| DE | 3152861 A1 * | 8/1983 |
| DE | 195 38 615 A1 | 4/1997 |
| DE | 197 53 909 A1 | 5/1999 |
| DE | 199 28 913 A1 | 1/2001 |
| FR | 2 203 485 | 5/1974 |

* cited by examiner

Primary Examiner—Michael Koczo, Jr.
(74) Attorney, Agent, or Firm—Ronald E. Greigg

(57) ABSTRACT

A piston pump for brake systems the region of the outlet valve is provided with a pressure chamber, an opposing chamber, and a flexible wall that divides the pressure chamber from the opposing chamber. The flexible wall has an elastically resilient diaphragm that is supported in an elastically flexible body.

16 Claims, 5 Drawing Sheets

PISTON PUMP

CROSS-REFERENCE TO RELATED APPLICATIONS

This application is a 35 USC 371 application of PCT/DE 02/00530 filed on Feb. 15, 2002.

BACKGROUND OF THE INVENTION

1. Field of the Invention

The invention relates to a piston pump of the type employed, for example, for a hydraulic slip-controlled vehicle brake system.

2. Description of the Prior Art

German patent application DE 42 26 646 A1 discloses a hydraulic vehicle brake system with a pump, in which a pressure damper is provided downstream of an outlet check valve of the pump. In order for the pressure damper to have an action of sufficient magnitude, this pressure damper must be provided with correspondingly large dimensions. Because of the pressure damper, the known vehicle brake system is quite large resulting in an increased manufacturing cost. When the brake pedal is actuated, part of the pressure fluid displaced by the action of the driver's foot is forced into the pressure damper. Because the pressure damper must be relatively large to achieve an effect of sufficient magnitude, a relatively large amount of pressure fluid must be displaced during an actuation of the brake pedal, which must be taken into account through a corresponding dimensioning of the components involved in this procedure. As a result, the known brake system is quite bulky.

SUMMARY AND ADVANTAGES OF THE INVENTION

The piston pump according to the invention has the advantage that the pulsation-smoothing device very effectively eliminates the pressure pulsations and pressure waves that would otherwise be produced in a piston pump. Because of the high degree of efficiency of the pulsation-smoothing device, it can be made quite compact and nevertheless achieve an action of sufficient magnitude. Because the pulsation-smoothing device can be quite compact, this offers the advantage of allowing the piston pump to be quite compact on the whole. This offers the advantage of a vehicle brake system that is compact as a whole. Because of its high-efficiency and the reservoir volume can be kept to a minimum, and this offers the advantage that with an actuation of the brake pedal, the pulsation-smoothing device absorbs at most an insignificant part of the pressure fluid pressurized by the action of the driver's foot so that the pulsation-smoothing device has practically no negative impact on the operation of the vehicle brake system during an actuation of the brake pedal.

Because the pulsation-smoothing device is quite compact and in particular because the reservoir volume of the pulsation-smoothing device can be kept quite compact, it is also advantageously unnecessary for a check valve to be provided downstream of the pulsation-smoothing device. The fact that this check valve is no longer required is an advantage because the manufacturing cost and the overall size of the vehicle brake system according to the invention can be kept to a minimum; it is also advantageous that the unnecessary additional check valve no longer represents a potential source of malfunction.

An elastically resilient diaphragm is particularly appropriate for higher pressures and high-frequency oscillations and can eliminate them in a particularly effective manner. The elastically flexible body is particularly appropriate for low-pressure regions and low-frequency oscillations and can eliminate them in a particularly effective manner. The combined action of the elastically resilient diaphragm with the elastically flexible body offers the advantage that a very effective oscillation damping and pressure pulsation damping are achieved over a large pressure range and a large frequency range. The piston pump can therefore be designed so that an effective pulsation damping and oscillation damping is achieved over practically the entire operating range of the piston pump.

Because the elastically resilient diaphragm is in fact relatively rigid but flexes even at low pressures and in the presence of low-frequency oscillations due to being supported in the elastically flexible body, this significantly increases the effect of the elastically flexible body since although only the elastically flexible body is deformed when there are small pressure pulsations and low pressures while the elastically resilient diaphragm is hardly deformed at all, a relatively broad flexing nevertheless occurs even in the low-pressure range, which results in a relatively large volume change in the pressure chamber in which the pressure pulsations are being reduced, even if the elastically flexible body itself has only a small overall volume. In other words, even when an elastically flexible body with a small volume is used, a relatively large volume change in the pressure chamber and consequently an effective damping of oscillations can nevertheless be achieved, even at low pressures.

The effective damping of pressure oscillations by the pulsation-smoothing device offers the advantage that significantly less noise is generated and the service life of the piston pump is lengthened considerably.

BRIEF DESCRIPTION OF THE DRAWINGS

The invention will be more fully described herein below, with reference to the drawings, in which.

DESCRIPTION OF THE PREFERRED EMBODIMENTS

Figure 1:
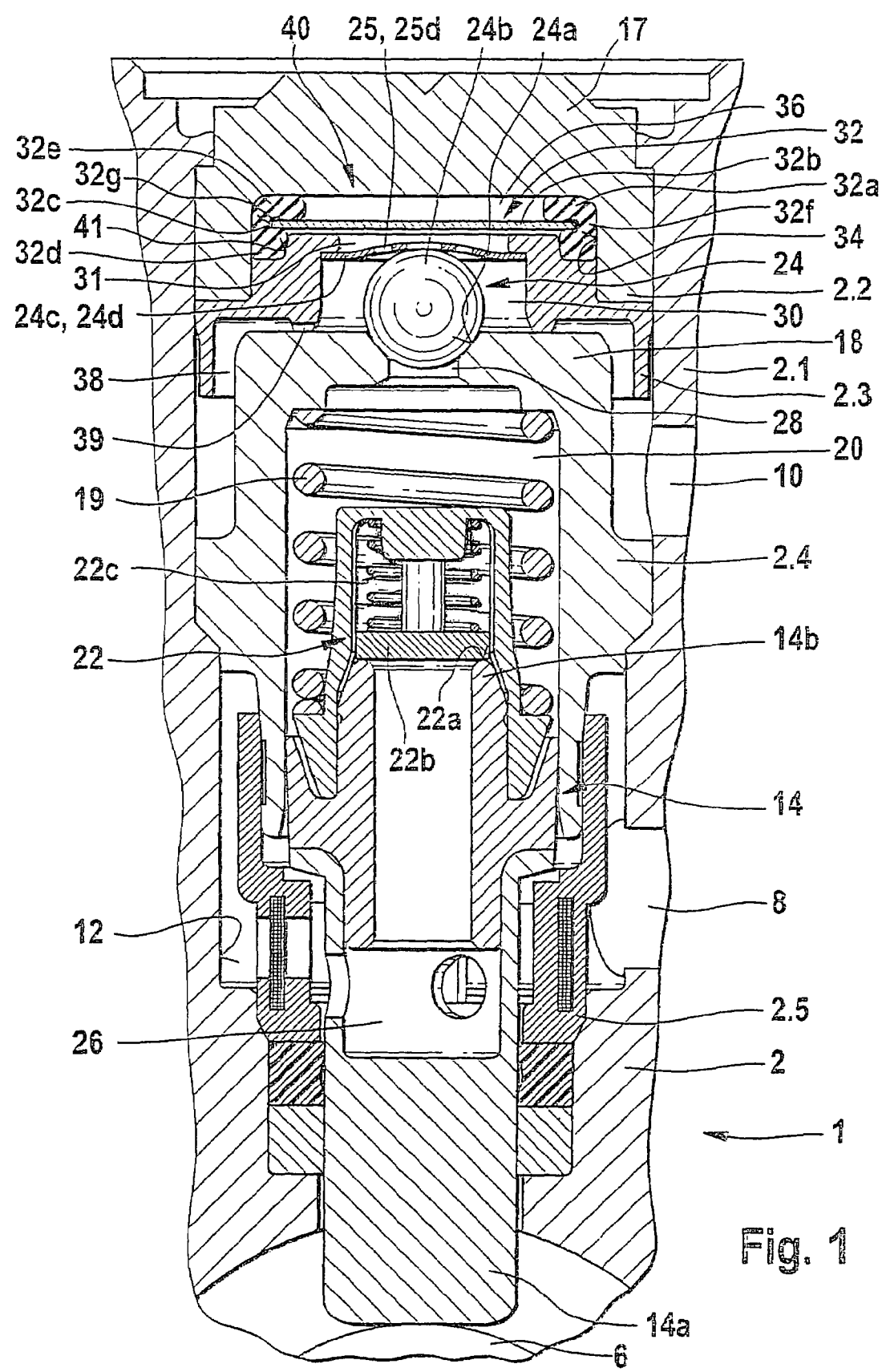
FIG. 1 shows a longitudinal section through the piston pump of a slip-controlled vehicle brake system of a preferably selected, particularly advantageous exemplary embodiment of the invention.

The piston pump shown in FIG. 1 is particularly provided as a pump in a brake system of a vehicle and is used to control the pressure in wheel brake cylinders. Depending on the type of brake system, these brake systems are referred to by the abbreviations ABS, TCS, ESP, or EHB. In the brake system, the pump is used, for example, to return brake fluid from one or more wheel brake cylinders to a master cylinder (ABS) and/or for supplying brake fluid from a reservoir into one or more wheel brake cylinders (TCS, ESP, or EHB). The pump is required, for example, in a brake system with a wheel slip regulation (ABS or TCS) and/or in a brake system used as a steering aid (ESP) and/or in an electrohydraulic brake system (EHB). Wheel slip regulation (ABS or TCS) can, for example, prevent the wheels of the vehicle from locking when powerful pressure is exerted on the brake pedal during a braking maneuver (ABS) and/or can prevent the driven wheels of a vehicle from spinning when powerful pressure is exerted on the accelerator pedal (TCS). In a brake system used as a steering aid (ESP), a brake pressure is built up in one or more wheel brake cylinders, independent of an actuation of the brake pedal or accelerator pedal, in order, for example, to prevent the vehicle from swerving out from the path desired by the driver. The pump can also be used in an electrohydraulic brake system (EHB) in which the pump supplies brake fluid to the wheel brake cylinder(s) when an electric brake pedal sensor detects an actuation of the brake pedal or in which the pump is used to fill a reservoir of the brake system.

FIG. 1 shows a first, particularly advantageous, preferably selected exemplary embodiment including a piston pump 1 installed in a hydraulic block of the vehicle brake system, a part of which is shown in a sectional view. A number of piston pumps 1 can be installed in the hydraulic block. The hydraulic block constitutes a pump housing 2 comprised of a first body 2.1 affixed to the housing, a second body 2.2 affixed to the housing, a third body 2.3 affixed to the housing, a fourth body 2.4 affixed to the housing, and a fifth body 2.5 affixed to the housing. The first body 2.1 is constituted by the hydraulic block of the vehicle brake system while fourth body 2.4 is inserted into the first body 2.1 and serves as a bushing.

The piston pump 1 includes the bushing 2.1 inserted into the pump housing 2, a cam 6, an inlet connection 8, and an outlet conduit 10. The pump housing 2 contains an installation space 12. The inlet connection 8 and the outlet conduit 10 extend through the hydraulic block or through the pump housing 2. The outlet conduit 10 has lines branching from it, not shown, which feed via hydraulic valves, not shown, that feed into a master cylinder, not shown, and into wheel brake cylinders, not shown.

The fourth body 2.4, which is affixed to the housing and serves as a bushing and a pump piston 14 are inserted into the installation space 12. The pump piston 14 that is supported so that it can slide in the pump housing 2 has an end 14a oriented toward the cam 6 and an end 14b oriented away from the cam 6. The cam 6 drives the pump piston 14 in a reciprocating fashion so that it executes an intake stroke and a compression stroke.

The installation space 12 provided in the pump housing 2 is closed toward the outside by the second body 2.2, which has a stopper component bottom 17 at its end oriented toward the outside. The fourth body 2.4 serving as a bushing has a bushing bottom 18 at its end oriented toward the second body 2.2 affixed to the housing. A return spring 19 that is supported on the bushing bottom 18 and against the pump piston 14 holds the end 14a of the pump piston 14 in contact with the cam 6. Between the bushing bottom 18 and the end 14b of the pump piston 14 oriented away from the cam 6, there is a compression chamber 20 that gets larger during an intake stroke and gets smaller during a compression stroke.

The piston pump 1 has an inlet valve 22. The inlet valve 22 has a valve seat 22a, a closing body 22b and a closing spring 22c. The closing spring 22c pushes the closing body 22b against the valve seat 22a provided on the valve body 14.

The piston pump 1 has an outlet valve 24. The outlet valve 24 has a valve seat 24a, a closing body 24b, and a closing spring 24c. The closing spring 24c presses the closing body 24b against the valve seat 24a affixed to the housing, for example provided in the bushing bottom 18. The closing spring 24c is embodied as an annular disc supported between the closing body 24b and the third body 2.3. The outer circumference of the spring 24d is supported against the third body 2.3 affixed to housing. The spring 24d is provided with a centrally located hole, which centers the spherically embodied closing body 24b.

The closing spring 24c is provided with one opening 25 or with a number of openings 25 preferably dimensioned large enough that the openings 25 constitute practically no throttle restriction for the pressure fluid. However, depending on the requirements of the piston pump 1 and depending on whether or not it is feasible, the at least one opening 25 can be provided with dimensions that are small enough to produce a throttling action 25d for the flowing fluid.

An inlet opening 26 leads from the inlet connection 8 to the inlet valve 22. An opening 28 leads from the compression chamber 20, through the bushing bottom 18, to the outlet valve 24. The valve seat 24a encompasses the opening 28.

An outlet chamber 30 is provided on the side of the closing body 24b oriented away from the opening 28. In other words, the outlet chamber 30 is the chamber that adjoins the downstream side of the valve seat 24a. In the selected exemplary embodiment, the outlet chamber 30 is disposed between the bushing bottom 18 and the spring 24d that functions more or less as a dividing wall.

The opening 25 connects the outlet chamber 30 to a pressure chamber 31.

A flexible wall 32 is installed in the second body 2.2 affixed to the housing. The flexible wall 32 divides the pressure chamber 31 from an opposing chamber 36. The opposing chamber 36 contains a slightly compressible medium, in particular a gas, preferably air.

As the exemplary embodiment shows, the flexible wall 32 is comprised of an elastically flexible body 32a and an elastically resilient diaphragm 32b. The diaphragm 32b has an outer circumference 32c. The elastically flexible body 32a has one circumferential leg 32d oriented toward the pressure chamber 31, one circumferential leg 32e oriented toward the opposing chamber 36, and a back piece 32f that holds the two legs 32d and 32e together. Between the two legs 32d and 32e, the elastically flexible body 32a has a circumferential pocket 32g. The outer circumference 32c of the resilient diaphragm 32b is inserted into the pocket 32g. The two legs 32d, 32e embrace the outer circumference 32c of the diaphragm 32b.

The second body 2.2 affixed to the housing is provided with a countersink 34. The flexible wall 32 is installed in the countersink 34 along with the body 32a and the diaphragm 32b. The elastically flexible body 32a is preferably made of rubber or an elastomer material. The third body 2.3 affixed to the housing has a step that engages in the countersink 34 so that when assembled, the elastically flexible body 32a of the flexible wall 32 is installed in the countersink 34 with initial stress in the axial and radial directions. Because of the axial initial stress of the body 32a, pressure fluid cannot escape from the pressure chamber 31 into the opposing chamber 36 and pressure fluid also cannot leak in the reverse direction, between the body 32a and the body 2.2 affixed to the housing, and in addition, pressure fluid cannot leak between the elastically flexible body 32a and the outer circumference 32c of the diaphragm 32b.

A connecting conduit 38 leads from the outlet chamber 30 into the outlet conduit 10. A throttle 39 is provided in the course of the connecting conduit 38. The throttle 39 is preferably disposed directly at the point at which the connecting conduit 38 conveys the pressure fluid out of the outlet chamber 30. In other words, the throttle 39 is preferably disposed in very close proximity to the outlet valve 24.

The pressure prevailing in the pressure chamber 31 acts on the flexible wall 32. The pressure in the pressure chamber 31 is essentially equal to the pressure in the outlet chamber 30. The opposing chamber 36 preferably contains an enclosed, hermetically sealed volume of gas.

The outlet chamber 30 is connected via the throttle 39 to the outlet conduit 10. The throttle 39 is disposed in the region of the outlet valve 24, in close proximity to the outlet valve 24. The presence of the throttle 39 assures that pressure pulsations in the pressure chamber 31 occurring in the region of the outlet valve 24 are concentrated on the flexible wall 32. The flexible wall 32 impedes pressure pulsations at the beginning, directly where the pulsations would be produced, thus preventing them from being able to propagate via the throttle 39 and into the outlet conduit 10.

In the exemplary embodiment shown, the outlet chamber 30, the pressure chamber 31, the flexible wall 32 that includes the elastically flexible body 32a and the elastically resilient diaphragm 32b, the opposing chamber 36, and the throttle 39, in cooperation with one another, constitute a highly efficient, effective pulsation-smoothing device 40. The components of the pulsation-smoothing device 40 are preferably disposed in the immediate vicinity of the outlet valve 24. As a result, the hydraulic flexibility of the pulsation-smoothing device 40 can be kept to a minimum. This offers the advantage of allowing the hydraulic system in the outlet conduit 10 to be kept quite rigid despite the very effective pulsation smoothing that can be achieved, even without the use of an additional check valve downstream of the pulsation-smoothing device 40.

Incorporating the flexible wall 32 and the opposing chamber 36 into the body 2.2 affixed to the housing achieves the advantage that a small overall number of parts are required and the piston pump 1 can be assembled without a significant increase in cost. The body 2.2 affixed to the housing is installed in the installation chamber 12 in a pressure-tight fashion by means of an intrinsically known flanged connection. The body 2.2 seals the high-pressure region of the piston pump 1 in relation to the outside.

The pressure pulsations in the outlet chamber 30 generated by the operation of the pump piston 14 and the outlet valve 24 are also present in the pressure chamber 31 because of the opening(s) 25.

Pressure pulsations in the range of relatively low pressures and in the range of low-frequency oscillations are essentially smoothed with the aid of the elastically flexible body 32a of the flexible wall 32. Low-frequency oscillations in the low-pressure range cause the diaphragm 32b to move toward the opposing chamber 36. This essentially does not deform the elastically resilient diaphragm 32b, but instead compresses the leg 32e of the flexible body 32a. The diaphragm 32b is rigid enough so that it is in particular, deformed practically exclusively in the high-pressure range. Because the resilient diaphragm 32b as a whole moves when the leg 32e is deformed, this results in a relatively large volume change in the pressure chamber 31 with a relatively small volume of the leg 32e of the flexible body 32a and a relatively slight deformation of the leg 32e. This has the advantage that even with a very low-volume flexible body 32a, a highly efficient elimination of pressure pulsations can be achieved even at relatively low pressures and with relatively low-frequency oscillations. This permits the piston pump 1 on the whole to be compactly designed.

The diaphragm 32b is preferably a relatively thin, plate-shaped disk made of a resilient material, for example spring steel. The degrees of elasticity and flexibility of the resilient diaphragm 32b are embodied so that in the presence of high pressures and high-frequency pressure pulsations in the pressure chamber 31, when an abrupt pressure increase occurs, the diaphragm 32b is deflected toward the opposing chamber 36 by means of bending and when an abrupt high-frequency pressure drop occurs in the pressure chamber 31, the diaphragm 32b springs back toward the pressure chamber 31. This results in the fact that even high-frequency pressure pulsations in close proximity downstream of the valve seat 24a are smoothed.

Particularly in the range of high pressures and in the range of high-frequency oscillations, the leg 32e of the flexible body 32a is compressed so that there is essentially no further deformation of the leg 32e, but rather, in the presence of high-frequency oscillations and high pressures, a volume change occurs in the pressure chamber 31 by means of a deflection and therefore deformation of the elastically resilient diaphragm 32b toward the opposing chamber 36, i.e. the diaphragm 32b is deflected toward the opposing chamber 36.

The flexible wall 32 depicted, which is comprised of the elastically flexible body 32a and the elastically resilient diaphragm 32b, assures that a highly efficient pressure pulsation smoothing can be achieved with very small components.

Because the elastically flexible body 32a of the flexible wall 32 also produces a seal between the pressure chamber 31 and the opposing chamber 36, the opposing chamber 36 can be favorably sealed without requiring an additional component.

The use of a leaf spring 24d as the closing spring 24c produces a favorable guidance of the closing body 24b. This is another measure for additionally reducing pulsations in the high-pressure region of the piston pump 1.

The body 2.3 affixed to the housing has a circumferential shoulder 41 formed onto it. The shoulder 41 permits a favorable encapsulation of the leg 32d of the elastic body 32a and also permits the piston pump 1 to be designed with a particularly small volume.

Figure 2:
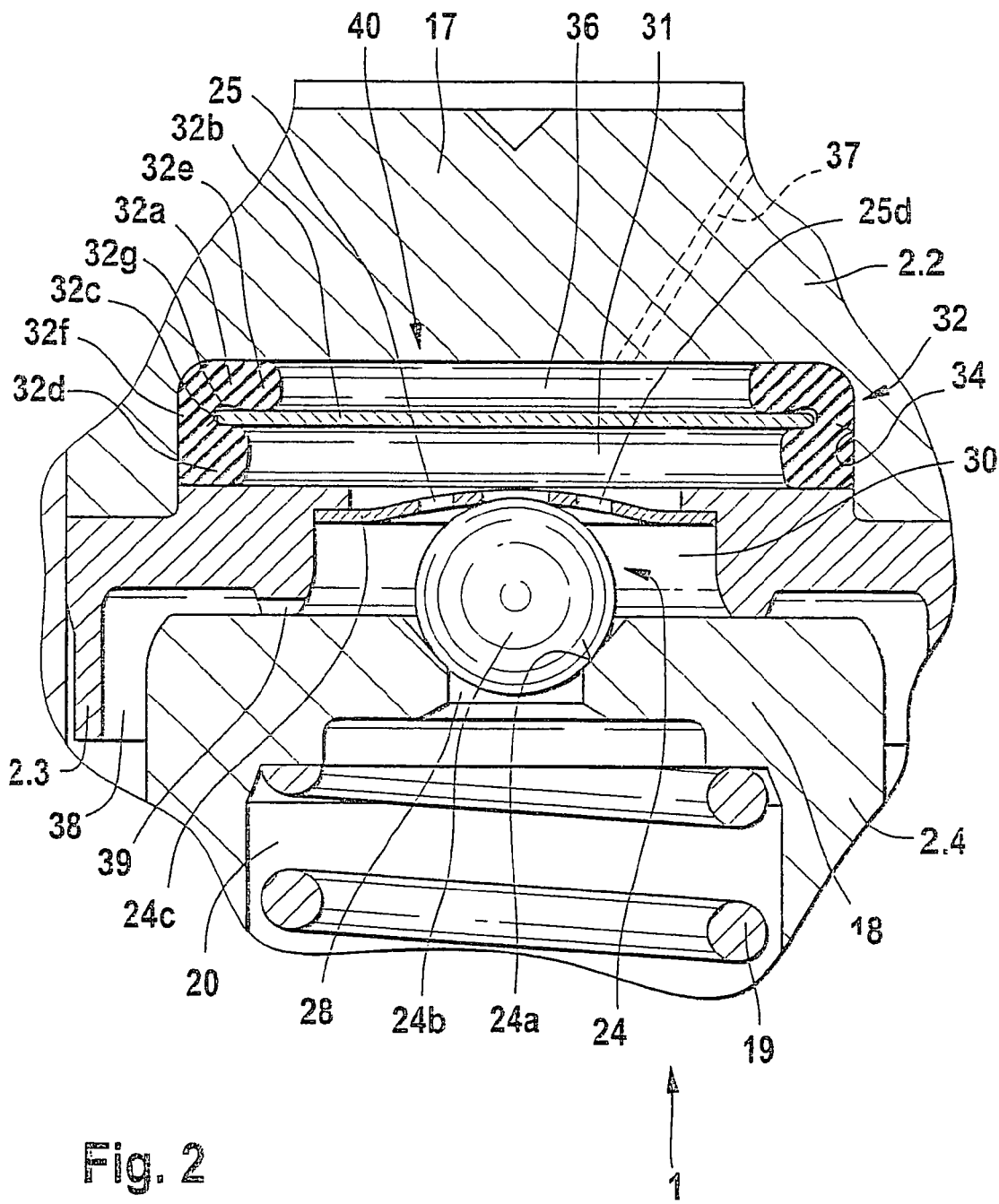
FIG. 2 shows an enlarged detail of a modified exemplary embodiment.

FIG. 2 shows an enlarged detail of a particularly advantageous, preferably selected, modified exemplary embodiment.

In all of the figures, parts that are the same or that function in the same manner are provided with the same reference numerals. Provided that nothing to the contrary is stated or is depicted in the drawings, that which is explained or depicted in one of the figures also applies to the other figures. Provided that the explanations contain nothing to the contrary, the details of the individual exemplary embodiments and the various figures can be combined with one another.

In contrast to FIG. 1, in the exemplary embodiment shown in FIG. 2, the shoulder 41 has been omitted.

It is optionally possible for the opposing chamber 36 to be closed in a sealed fashion or to be connected to the atmosphere by means of a small opening 37 depicted with dashed lines in FIG. 2.

Figure 3:
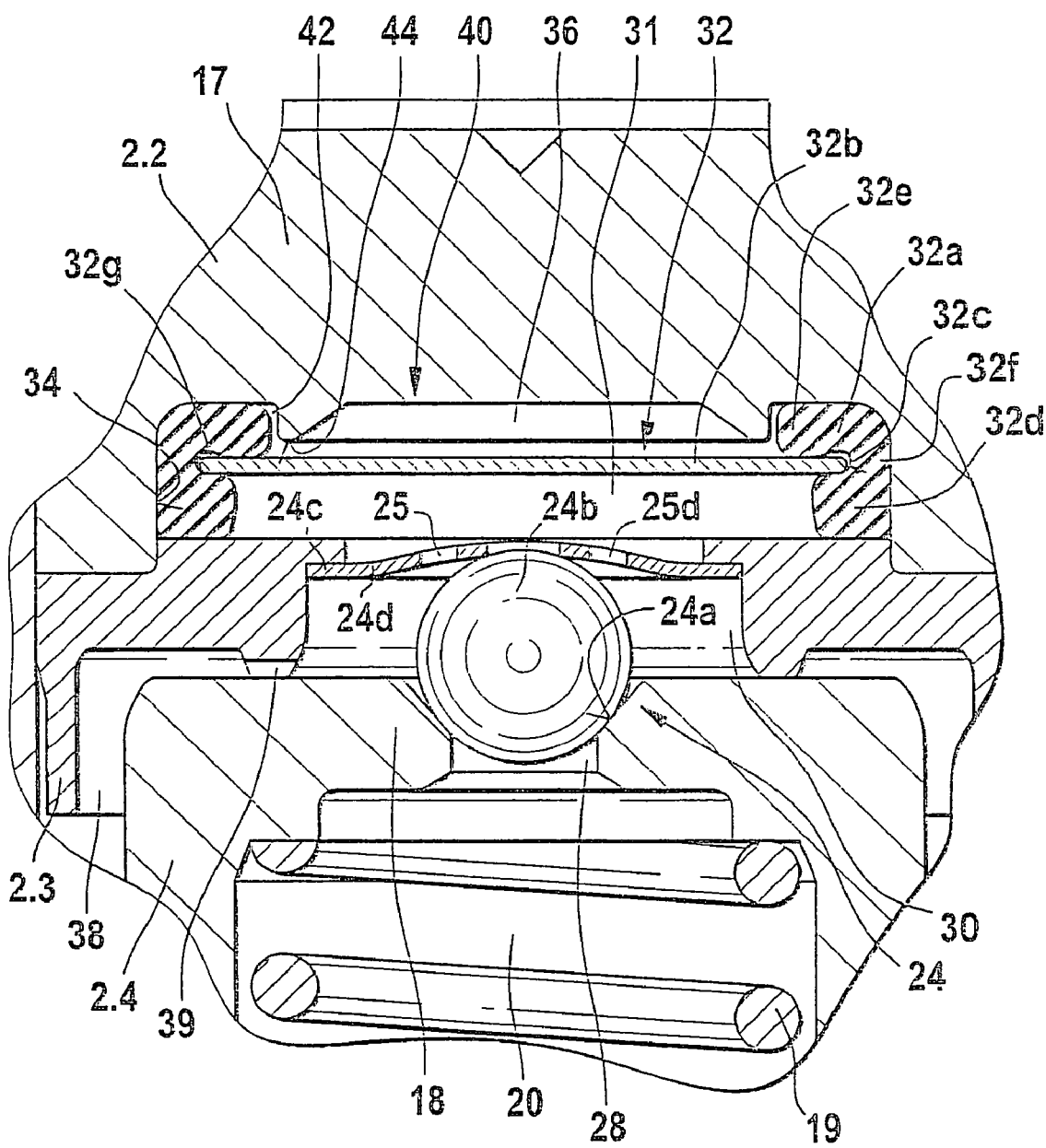
FIG. 3 shows an enlarged detail of another modified exemplary embodiment.

FIG. 3 shows an enlarged detail of another particularly advantageous, preferably selected, modified exemplary embodiment.

In the exemplary embodiment shown in FIG. 3, a circumferential groove 42 is let into the end surface of the countersink 34 provided in the second body 2.2. The groove 42 serves to reliably contain the leg 32e of the elastically flexible body 32a.

In addition, a stop 44 affixed to the housing is provided at the end of the countersink 34 of the second body 2.2 affixed to the housing. The stop 44 is preferably circumferential and is preferably disposed in the vicinity of the inner circumference of the leg 32e of the flexible body 32a. In the event of a high pressure in the pressure chamber 31, the elastically resilient diaphragm 32b is supported against the stop 44. This results in the fact that even at a very high pressure in the pressure chamber 31, the leg 32e of the elastically flexible body 32a is protected from excessive compression and is therefore protected from being overloaded.

The stop 44 is provided in the vicinity of the outer circumference 32c of the diaphragm 32b. The radially inner region of the diaphragm 32b does not touch the stop 44. As a result, even when there are high pressures and high-frequency oscillations, the stop 44 does not obstruct the diaphragm 32b. Consequently, the pulsation damping is assured at every pressure and every frequency.

Figure 4:
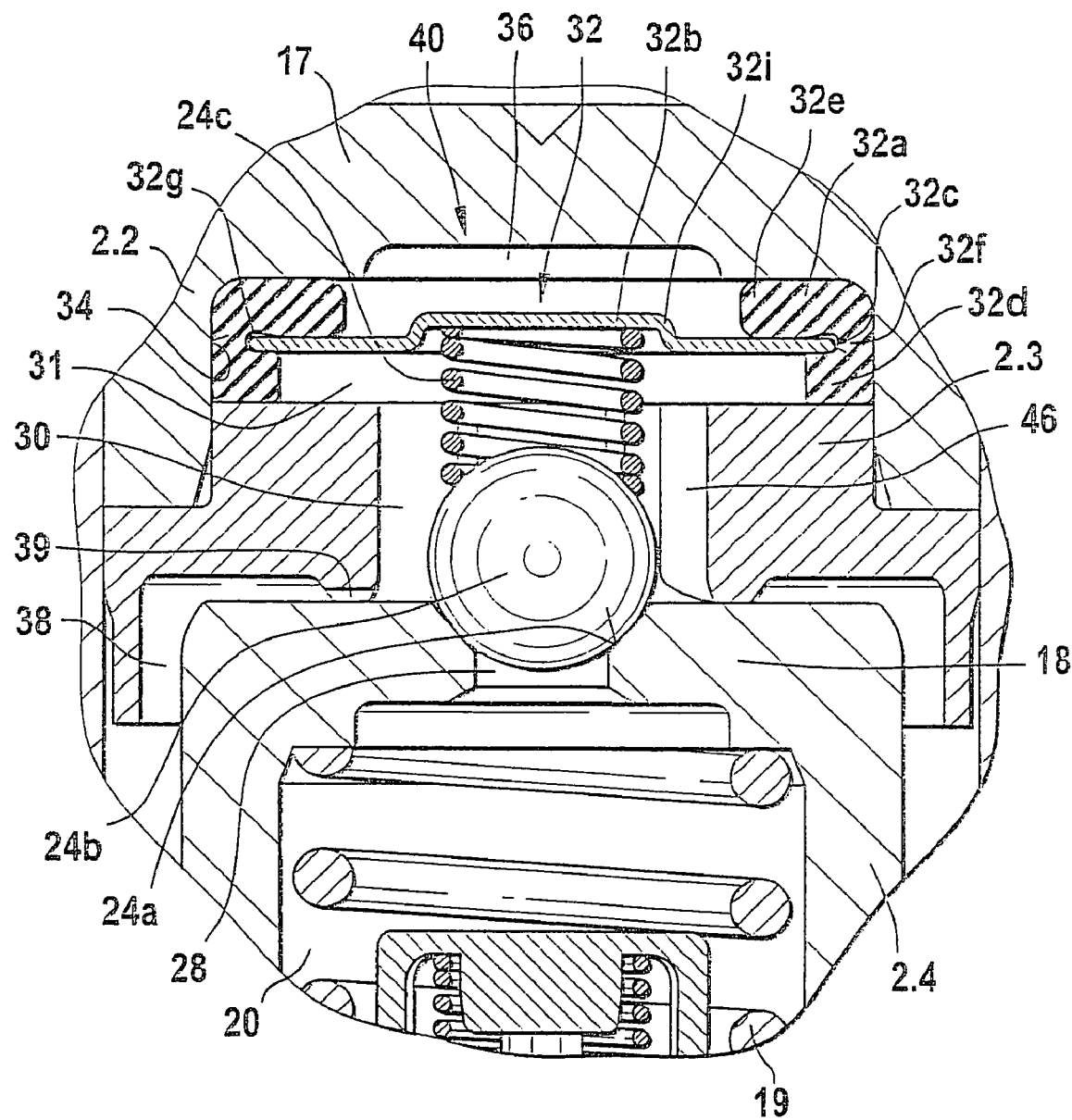
FIG. 4 shows an enlarged detail of a fourth modified exemplary embodiment.

FIG. 4 shows an enlarged detail of another particularly advantageous, preferably selected, modified exemplary embodiment.

In the piston pump shown by way of example in FIG. 4, the elastically resilient diaphragm 32b is preformed into a cup shape or hat shape. This provides a good receptacle for the closing spring 24c of the outlet valve 24 and achieves an improved elasticity of the diaphragm 32b that is even better adapted to the pressures that occur.

Viewed in hydraulic terms, the outlet chamber 30 and the pressure chamber 31 can be considered as a single, coherent chamber.

The body 2.3 affixed to the housing has for example three guide ribs 46 that guide the closing body 24b.

Figure 5:
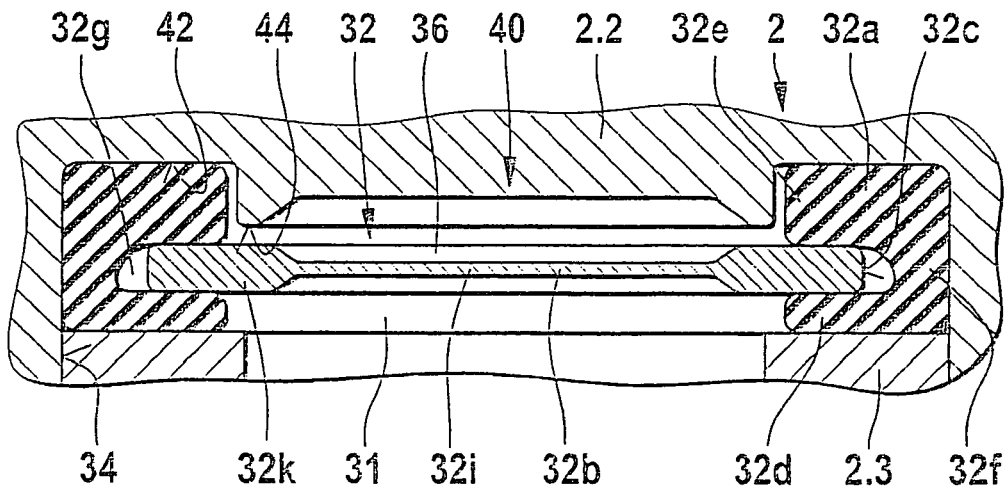
FIG. 5 shows an enlarged detail of a fifth modified exemplary embodiment.

FIG. 5 shows an enlarged detail of another particularly advantageous, preferably selected, modified exemplary embodiment.

In the embodiment shown in FIG. 5, the elastically resilient diaphragm 32b has a radially inner region 32i and a radially outer, circumferential region 32k. As can be clearly inferred from the drawing, the circumferential region 32k is significantly thicker than the inner region 32i of the diaphragm 32b.

Because the inner region 32i of the diaphragm 32b is quite thin, the diaphragm 32b has a pronounced ability to oscillate. Because the circumferential, outer region 32k is quite thick, this prevents oscillation-induced deformation of the diaphragm 32b in the region in which the diaphragm 32b is held in the elastic body 32a. This contributes to a reliable seal.

Figure 6:
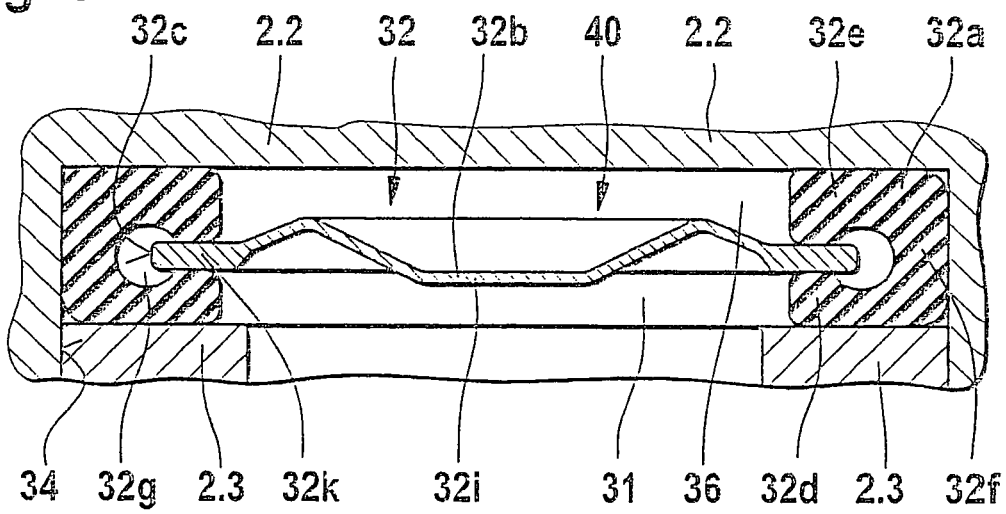
FIG. 6 shows an enlarged detail of a sixth modified exemplary embodiment.

FIG. 6 shows an enlarged detail of another particularly advantageous, preferably selected, modified exemplary embodiment.

In the exemplary embodiment of the piston pump 1, a detail of which is depicted in FIG. 6, the radially inner region 32i of the diaphragm 32b is pre-deformed in the oscillation direction. A greater or lesser pre-deformation of the diaphragm 32b in the oscillation direction allows the oscillation capacity of the diaphragm 32b to be adapted as needed.

Figure 7:
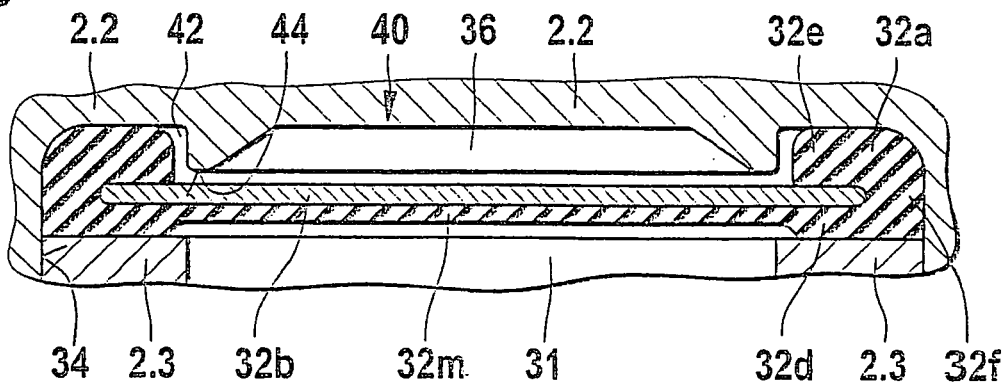
FIG. 7 shows an enlarged detail of another modified exemplary embodiment of the piston pump.

FIG. 7 shows a detail of another preferably selected, particularly advantageous exemplary embodiment of the piston pump 1.

The elastically flexible body 32a can, for example, also be vulcanized onto the resilient diaphragm 32b. It is also possible for the resilient diaphragm 32b to be extrusion coated with the elastically flexible body 32a.

As shown in FIG. 7, the entire surface of the diaphragm 32b oriented toward the pressure chamber 31 can be coated with the elastically flexible body 32a. The surface of the diaphragm 32b oriented toward the pressure chamber 31 is provided with a coating 32m. The coating 32m can also optionally be provided on both surfaces of the diaphragm 32b or also on only the surface of the diaphragm 32b oriented toward the opposing chamber 36. The coating 32m is of one piece with the elastically flexible body 32a and is attached to the entire surface of the diaphragm 32b without being interrupted by the leg 32d. This assures an absolutely tight seal between the diaphragm 32b and the elastically flexible body 32a.

The foregoing relates to preferred exemplary embodiments of the invention, it being understood that other variants and embodiments thereof are possible within the spirit and scope of the invention, the latter being defined by the appended claims.

What is claimed is:

1. A piston pump comprising
a pump housing (2),
a pump piston (14) that is supported so that can slide in the pump housing (2),
an inlet valve (22),
an outlet valve (24),
a compression chamber (20) provided in the pump housing (2) between the inlet valve (22) and the outlet valve (24), the compression chamber (20) increasing in size during an intake stroke of the pump piston (14) and decreasing in size during a compression stroke of the pump piston (14),
a pressure chamber (31) disposed downstream of the outlet valve (24), and
a flexible wall (32, 32a, 32b) that delimits the pressure chamber (31) in relation to an opposing chamber (36), wherein a pressure in the pressure chamber (31) acts on the flexible wall (32, 32a, 32b),
the flexible wall (32, 32a, 32b) having an elastically resilient diaphragm (32b) of a spring-elastic material supported in an elastically flexible body (32a) of a rubber-elastic material, the rubber-elastic material being considerably softer than the spring-elastic material.

2. The piston pump according to claim 1, wherein the pressure chamber (31) and the flexible wall (32, 32a, 32b) are disposed in the vicinity of the outlet valve (24).

3. The piston pump according to claim 2, wherein the flexible wall (32, 32a, 32b) is supported in a body (2, 2.2, 2.3) affixed to the housing, and wherein the elastically flexible body (32a) produces a seal between the elastically resilient diaphragm (32b) and the body (2, 2.2, 2.3) affixed to the housing.

4. The piston pump according to claim 2, wherein the elastically flexible body (32a) is disposed in the form of a ring on an outer circumference (32c) of the elastically resilient diaphragm (32b).

5. The piston pump according to claim 1, wherein the flexible wall (32, 32a, 32b) is supported in a body (2, 2.2, 2.3) affixed to the housing, and wherein the elastically flexible body (32*a*) produces a seal between the elastically resilient diaphragm (32*b*) and the body (2, 2.2, 2.3) affixed to the housing.

6. The piston pump according to claim 5, wherein the elastically flexible body (32*a*) is disposed in the form of a ring on an outer circumference (32*c*) of the elastically resilient diaphragm (32*b*).

7. The piston pump according to claim 1, wherein the elastically flexible body (32*a*) is disposed in the form of a ring on an outer circumference (32*c*) of the elastically resilient diaphragm (32*b*).

8. The piston pump according to claim 7, wherein the elastically resilient diaphragm (32*b*) has a first surface and a second surface and that in the region of the outer circumference (32*c*) of the elastically resilient diaphragm (32*b*), the elastically flexible body (32*a*) encompasses the outer circumference (32*c*), extending into the vicinity of at least one of the two surfaces of the elastically resilient diaphragm (32*b*).

9. The piston pump according to claim 1, further comprising a stop (44) affixed to the housing, a partial region of the flexible wall (32, 32*a*, 32*b*) coming into contact with the stop (44).

10. The piston pump according to claim 1, wherein in the region outside its support in the elastically flexible body (32*a*), the diaphragm (32*b*) has a smaller thickness than in the region in which it is supported in the elastically flexible body (32*a*).

11. The piston pump according to claim 1, wherein the diaphragm (32*b*) is pre-deformed in the oscillation direction.

12. The piston pump according to claim 1, further comprising an outlet chamber (30) downstream of the outlet valve (24), and a throttle (39) downstream of the outlet chamber (30).

13. The piston pump according to claim 1, wherein the outlet valve (24) comprising a valve seat (24*a*), a closing body (24*b*), and a leaf spring (24*d*) that pushes the closing body (24*b*) against the valve seat (24*a*).

14. The piston pump according to claim 1, further comprising throttling means (25*d*) between the outlet valve (24) and the pressure chamber (31).

15. The piston pump according to claim 14, wherein the throttle means is provided in the leaf spring (24*d*).

16. The piston pump according to claim 1, further comprising a compressible medium contained in the opposing chamber (36).

* * * * *